(12) United States Patent
Wongkasem et al.

(10) Patent No.: US 11,329,389 B2
(45) Date of Patent: May 10, 2022

(54) METHOD FOR FABRICATING A HYPERBOLIC METAMATERIAL HAVING A NEAR-ZERO REFRACTIVE INDEX IN THE OPTICAL REGIME

(71) Applicant: The Board of Regents of the University of Texas System, Austin, TX (US)

(72) Inventors: Nantakan Wongkasem, Brownsville, TX (US); Andres Ochoa, Alton, TX (US)

(73) Assignee: Board Of Regents, The University of Texas System, Austin, TX (US)

( * ) Notice: Subject to any disclaimer, the term of this patent is extended or adjusted under 35 U.S.C. 154(b) by 268 days.

(21) Appl. No.: 16/521,275

(22) Filed: Jul. 24, 2019

(65) Prior Publication Data

US 2020/0036099 A1      Jan. 30, 2020

Related U.S. Application Data

(60) Provisional application No. 62/703,747, filed on Jul. 26, 2018.

(51) Int. Cl.
*G02B 1/10* (2015.01)
*H01Q 15/00* (2006.01)

(52) U.S. Cl.
CPC ............ *H01Q 15/0086* (2013.01); *G02B 1/10* (2013.01)

(58) Field of Classification Search
CPC ...... H01Q 15/0086; G02B 1/10; G02B 5/008; G02B 1/002; G02B 1/005; G02B 1/007
See application file for complete search history.

(56) References Cited

U.S. PATENT DOCUMENTS

| | | | | |
|---|---|---|---|---|
| 4,898,790 A * | 2/1990 | Finley | ................. | C03C 17/3652 428/673 |
| 4,902,580 A * | 2/1990 | Gillery | ................ | C03C 17/3681 428/673 |
| 5,453,908 A * | 9/1995 | Tsu | ......................... | H01L 28/56 361/321.5 |
| 5,617,290 A * | 4/1997 | Kulwicki | ................ | H01L 28/55 361/321.4 |
| 5,635,741 A * | 6/1997 | Tsu | ......................... | H01L 28/55 257/532 |
| 5,672,378 A * | 9/1997 | Maher | ..................... | C04B 41/88 264/618 |
| 5,821,001 A * | 10/1998 | Arbab | ................. | C03C 17/3618 428/630 |
| 9,653,673 B1 * | 5/2017 | Dea | ......................... | F03B 17/00 |

(Continued)

OTHER PUBLICATIONS

Ochoa et al., "Visible Near-Zero Refractive Index Metamaterials", Meta 2017 Conference, Incheon—Korea, Jul. 25-28, 2017.

*Primary Examiner* — Balram T Parbadia
(74) *Attorney, Agent, or Firm* — Antony P. Ng; Russell Ng PLLC

(57) ABSTRACT

A method for fabricating a hyperbolic metamaterial coating having a near-zero refractive index is disclosed. The direction of propagating light changes by means of generating subwavelength structures that alter the coatings permittivity and permeability. The coating can be deposited on lenses or incorporated into optical devices. This type of metamaterial can be utilized to direct light towards sensors or to collect light efficiently.

19 Claims, 3 Drawing Sheets

(56) References Cited

U.S. PATENT DOCUMENTS

| | | | |
|---|---|---|---|
| 2003/0061694 A1* | 4/2003 | Kamitani | H01G 4/12 29/25.42 |
| 2003/0157766 A1* | 8/2003 | Uchiyama | H01L 27/10808 438/240 |
| 2012/0161600 A1* | 6/2012 | Norris | B81C 1/00119 156/247 |
| 2013/0314765 A1* | 11/2013 | Padilla | G01K 7/003 359/315 |
| 2014/0302310 A1* | 10/2014 | Cowell, III | H01L 29/154 428/472 |
| 2015/0205021 A1* | 7/2015 | Howell | C03C 17/36 359/359 |
| 2015/0285953 A1* | 10/2015 | Naik | H01L 51/5262 257/40 |
| 2018/0138589 A1* | 5/2018 | Clegg | B32B 5/18 |
| 2019/0031955 A1* | 1/2019 | Smalley | C09K 11/7492 |

* cited by examiner

METHOD FOR FABRICATING A HYPERBOLIC METAMATERIAL HAVING A NEAR-ZERO REFRACTIVE INDEX IN THE OPTICAL REGIME

PRIORITY CLAIM

The present application claims priority under 35 U.S.C. § 119(e)(1) to provisional application No. 62/703,747 filed on Jul. 26, 2018, the contents of which are incorporated herein by reference.

TECHNICAL FIELD

The present invention relates to hyperbolic metamaterials in general, and in particular to a method for fabricating hyperbolic metamaterials having a near-zero refractive index.

BACKGROUND

Hyperbolic metamaterials, which are composed of a plasmonic material and a dielectric material, may be constructed as multilayer structures or nanorods. As multilayer structures, an ideal metamaterial has infinite layers of alternating plasmonic and dielectric materials.

A multilayer structure having plasmonic materials located on each side of a deposition has been shown to have better simulation results. For example, this type of multilayer structure can be constructed by using three layers of metal interlaced with two layers of dielectric materials, which can be referred to as a MDMDM structure. A thicker multilayer structure can be further formed by stacking the MDMDM structure on top of each other.

Silver is commonly used as a plasmonic material for a multilayer structure because it has a lower value in the imaginary part of its dielectric equation compared to other materials, indicating its lower dielectric loss over other materials. However, silver has a considerable loss in transmission with thickness. Transparent conducting oxides and nitride compounds have been contemplated as replacements.

Titanium dioxide and silicon dioxide, as metal oxide thin film, are commonly viewed as plasmonic materials. Titanium dioxide has a high dielectric function occurring in its natural form, but significantly drops when deposited. Ferroelectric materials and perovskites have shown promise when used in metamaterials due to their high dielectric function after deposition.

The present disclosure provides a method for fabricating a hyperbolic metamaterial that yields better transmission and lower loss from reflection and absorption.

SUMMARY OF THE INVENTION

In accordance with one embodiment of the present invention, a fill fraction of silver is initially determined. A barium strontium titanate (BST) material is then formed by mixing barium titanate (BTO) powder with strontium titanate (STO) powder. After a first layer of silver has been deposited on a substrate, a layer of the BST is deposited on the first layer of silver. Next, a second layer of silver is deposited on the BST layer. Finally, the substrate is annealed at a temperature that is above the Curie temperature of the BST material formed with BTO and STO.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
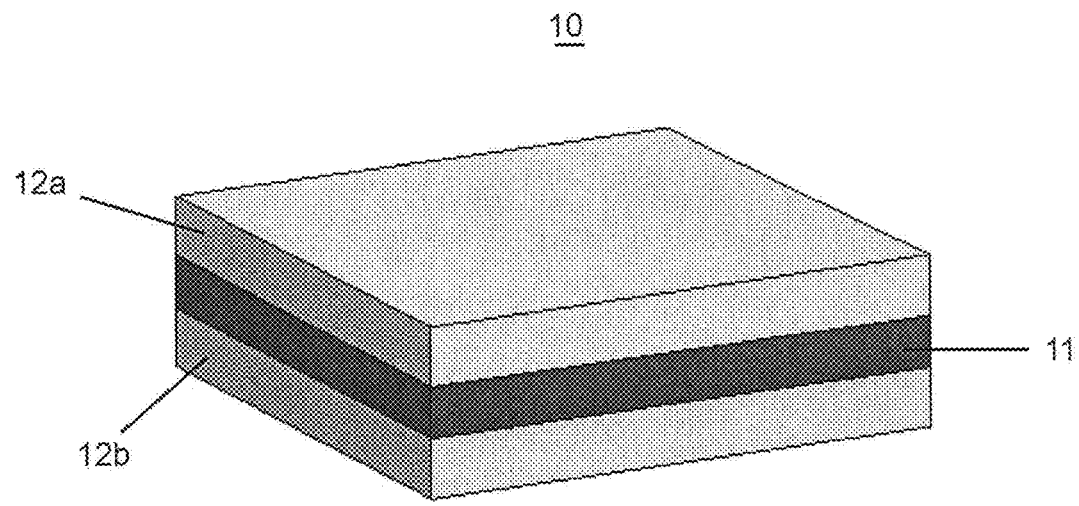
FIG. 1 is an isomeric view of a metamaterial, according to one embodiment.

A metamaterial can be constructed by using a dielectric material and a plasmonic material. Referring now to the drawings and in particular to FIG. 1, there is illustrated an isomeric view of a metamaterial, according to one embodiment. As shown, a metamaterial 10 is formed by placing a dielectric material layer 11 between two plasmonic material layers 12a, 12b. This structure is known as a MDM multilayer. For the present embodiment, plasmonic material layers 12a, 12b are made of silver, and dielectric material layer 11 is made of barium strontium titanate (BST) along with any ratio of barium titanate (BTO) to strontium titanate (STO), including BTO and STO by themselves. In this case, the BST ratio would be considered $Ba_1Sr_0TiO_3$ when using BTO, and $Ba_0Sr_1TiO_3$ when using STO. BST with equal parts is indicated as $Ba_{0.5}Sr_{0.5}TiO_3$. BST, BTO and STO are ferroelectric materials with a perovskite crystal structure. Alternatively, plasmonic material layers 12a, 12b can be made of gold.

Figure 2:
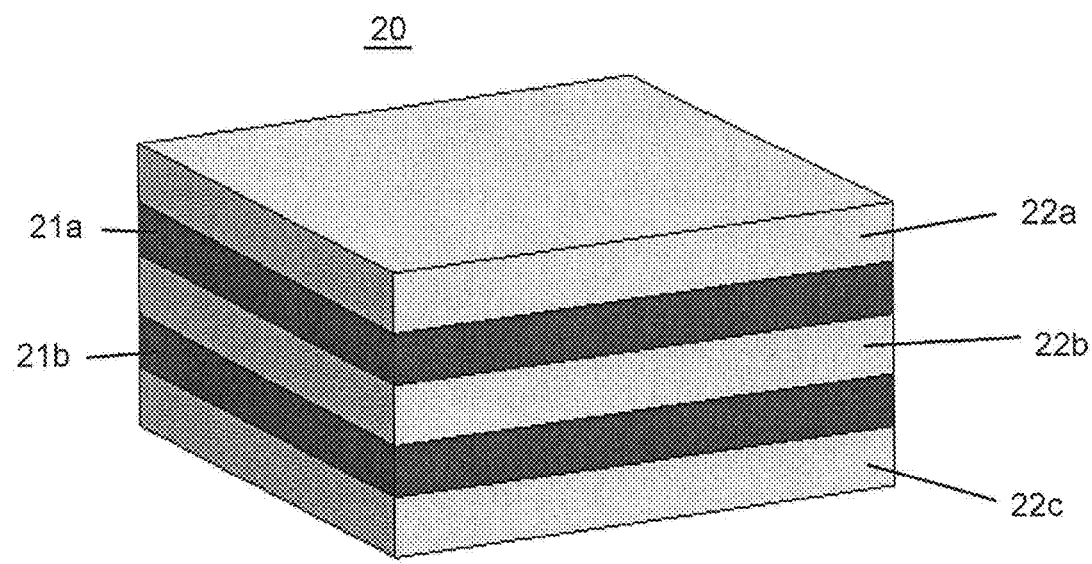
FIGS. 2-3 are isomeric views of metamaterial stacks, according to one embodiment.

Additional dielectric and metal layers can be applied to MDM multilayer shown in FIG. 1 to form a metamaterial 20 having two dielectric material layers 21a, 21b interlaced between three plasmonic material layers 22a, 22b, 22c, as depicted in FIG. 2. The MDM multilayer shown in FIG. 1 can be further stacked to form an even thicker multilayer, such as a metamaterial 30 having plasmonic material layers 32a, 32b as the outside layers as shown in FIG. 3.

After a desired total thickness and number of layers of a multilayer have been decided, the thickness of each layer of plasmonic material and dielectric material of the metamaterial can be determined, noting that there will be one more plasmonic material layer than dielectric material layer. The thickness of each individual layer within the multilayer must be smaller than the wavelength of an electromagnetic wave that is applicable to the multilayer.

Figure 3:
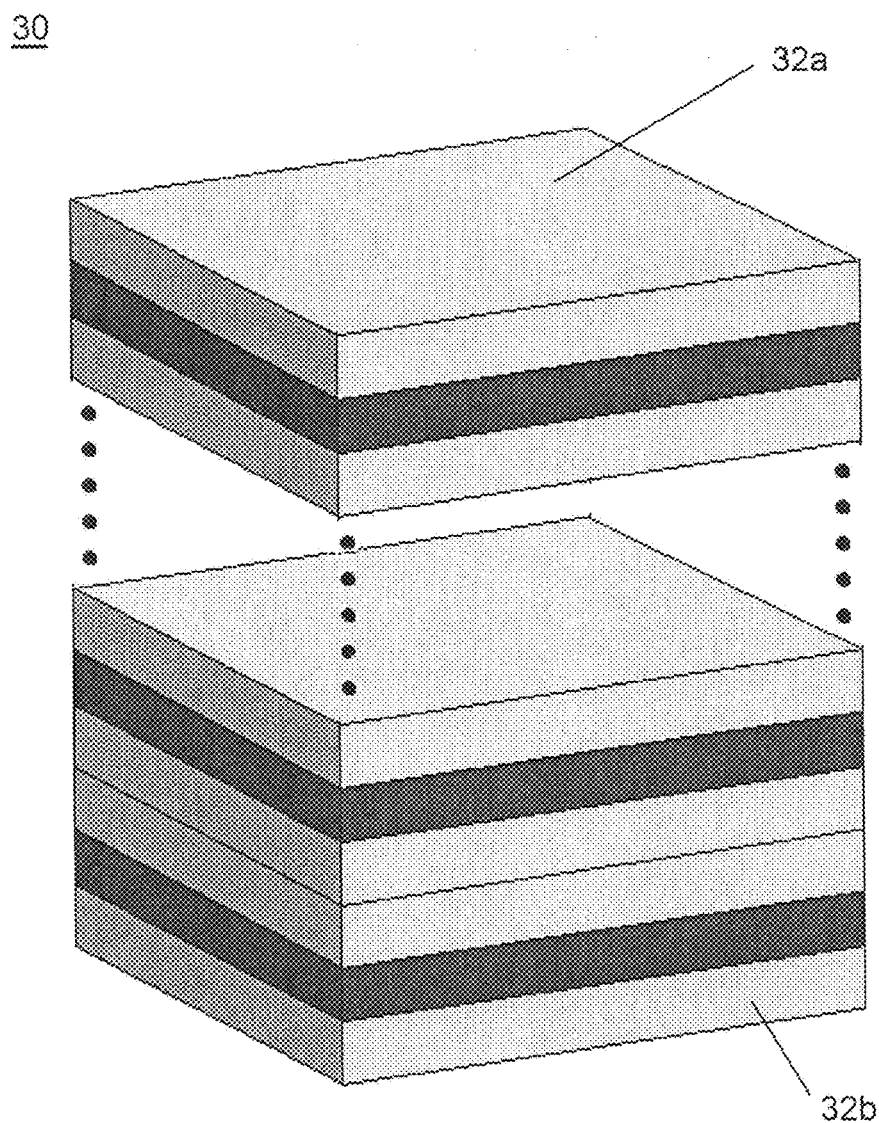

There are several known methods for acquiring the fill fraction of a metamaterial, such as metamaterials 10, 20 and 30 in FIGS. 1-3, respectively. The fill fraction corresponds to a frequency that will be used with the metamaterial. For metamaterial 10, a fill fraction is the ratio of the thickness of plasmonic material layers 12a, 12b over the combined thickness of plasmonic material layers 12a, 12b and dielectric material layer 11, as follows:

$$\text{fill fraction } (\%) = H_m/(H_m+H_d) \times 100\%$$

where $H_m$ is the total thickness of all plasmonic material layers, and $H_d$ is the total thickness of all dielectric material layers.

Figure 4:
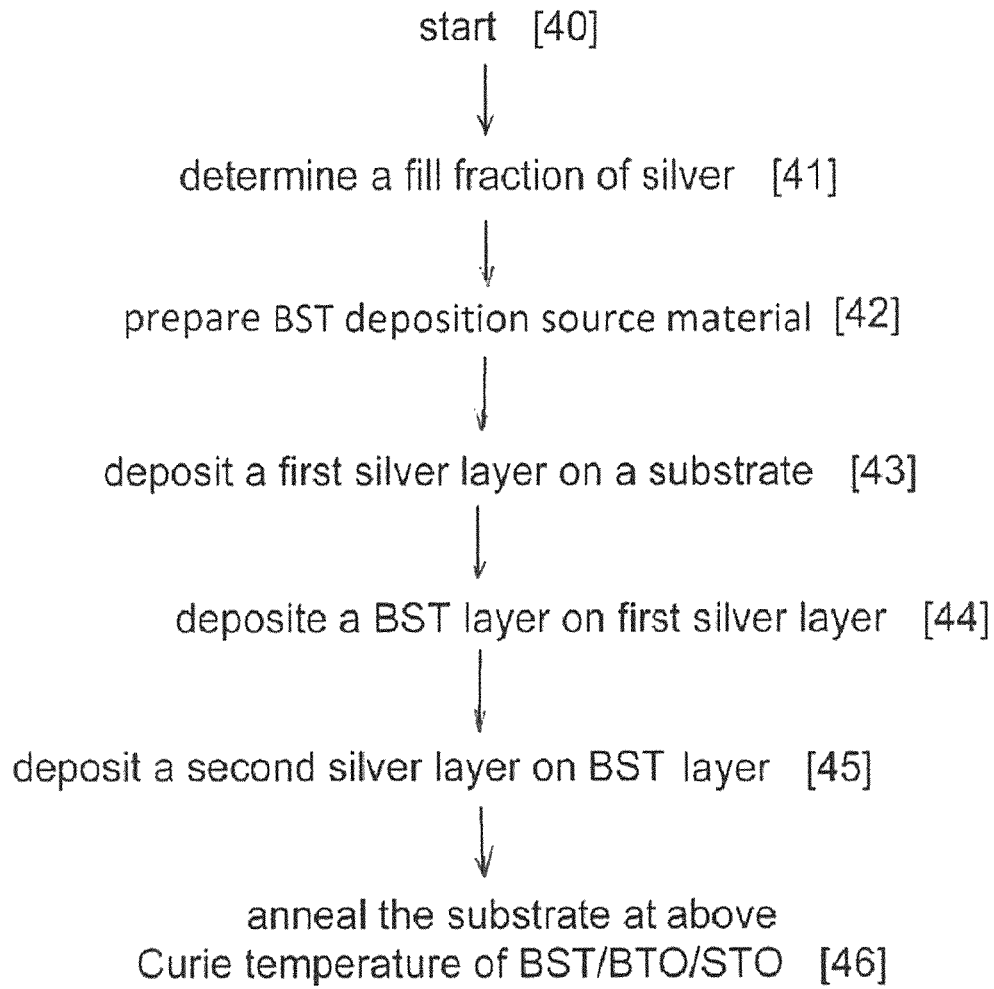
FIG. 4 is a process flow diagram of a method for fabricating the metamaterial from FIG. 1, according to one embodiment.

With reference now to FIG. 4, there is illustrated a process flow diagram of a method for fabricating metamaterial 10 from FIG. 1, according to one embodiment. Starting at block 40, the fill fraction of plasmonic material layers 12a, 12b is determined, as shown in block 41. For the present embodiment, silver is chosen to be plasmonic material layers 12a, 12b within metamaterial 10. Alternatively, instead of silver, gold can also be utilized as plasmonic material layers 12a, 12b within metamaterial 10. The fill fraction is the amount of silver, measured as a summation of thickness (or heights) of all silver layers within metamaterial 10, over the total thickness of metamaterial 10. This fill fraction determines the refractive index of metamaterial 10, depending on the wavelength of an electromagnetic wave. For example, if a refractive index of zero for a specific electromagnetic wavelength is the goal, then the fill fraction must be calculated by taking into account the dielectric functions of both silver and BST to obtain the X, Y and Z components of the dielectric function of metamaterial 10.

Next, BTO powder is mixed with STO powder to form BST powder as the dielectric material for dielectric material layer 11 within multilayer 10, as depicted in block 42. BST is a ferroelectric with a high dielectric function. BTO powder is combined with STO powder in specified ratios before turning the mixture into the BST deposition source material. As is the case in several methods of deposition, a pre-manufactured target is required. The BST material may include a composition of BTO and STO ranging from 90/10 to 10/90 mole percent. A BST composition of 50 mole percent BTO and 50 mole percent STO is preferred. A BST layer with more STO than BTO should have a higher refractive index and a higher dielectric function. BTO and STO by themselves (i.e., not in BST form) can also be used as the dielectric material, but their refractive index becomes fixed.

A single layer of silver is initially deposited on a substrate, as shown in block 43. The substrate can be lenses, wafers or plates of fused silica, or other materials with high thermal stability. Before deposition, the surface of the substrate should be clean and free of particles. Depending on the surface of the substrate, the deposition of silver can have different rates of growth. The pressure at which deposition occurs should be approximately 5 milliTorr (mTorr) to ensure a good adhesion on an amorphous substrate such as glass. The DC power applied on a two-inch diameter target of silver is 40 Watts. The rate of deposition is 12 nanometers per minutes on glass.

Then, a layer of BST is deposited on top of the silver layer, as depicted in block 44. A thin film deposition of BST is performed at a radio-frequency (RF) power of 60 Watts being applied to the target. A lower RF power can be utilized, but the deposition time may be prolonged based on the rate of deposition. The pressure for deposition is approximately 5 mTorr. The rate of deposition of BST may vary more than the rate of deposition of silver, depending on the method. Even if the rate is determined, the adhesion time of BST particles on silver may not be exactly at the beginning of the deposition process. The actual adhesion may start several minutes later.

The thickness of each individual layer within metamaterial 10 has to be smaller than the wavelength of an electromagnetic wave. For a single stack multilayer structure, such as metamaterial 10, the thickness of the entire stack is the total desired stack. For a multi-stack multilayer structure, such as metamaterials 20 or 30, the thickness of each stack is the total thickness of the multilayer structure divided by the number of stacks. Preferably, the overall thickness of a multilayer structure is close to the length of a quarter wavelength in order to take advantage of constructive interference and minimize transmission loss from silver.

For the present embodiment, the total thickness of silver is the overall thickness of the stack multiplied by the fill fraction of silver as a decimal. The thickness of each layer of silver can determined via dividing the thickness of silver by the number of silver layers. The thickness of BST can be determined by subtracting the thickness of silver layer from the total thickness. The thickness of each layer of BST can be determined via dividing the thickness of BST by the number of layers. The minimum number of layers within metamaterial 10 is three, with two layers of silver and one layer of BST located in between.

The number of layers in the multilayer structure should be determined prior to fabrication. For example, a single stack of 50 nanometers with 60% fill fraction of silver should have a total thickness of 30 nanometers of silver and 20 nanometers of BST. If the stack is composed of five layers (e.g., 3 layers of silver and 2 layers of BST), then the thickness of each individual silver layers is 10 nanometers (i.e., 30 nm of silver divided by 3 layers). The thickness of each layer of BST in the present example is 10 nanometers (i.e., 20 nm of BST divided by 2 layers).

Next, another layer of silver is deposited on the layer of BST, as shown in block 45. If the stack is composed of the minimum three layers, then this is where deposition is concluded. If more layers are needed to complete the stack, then alternating layer of BST and silver are deposited to reach the predetermined number of layers.

If the metamaterial structure is designed to have several stacks located on top of each other, then the steps shown in blocks 44 and 45 are repeated for each stack until all stacks have been deposited. Note that since the bottom and top layers are silver for each stack, there will be points where two layers of silver meet. The deposition at these points may be done either by depositing two layers of silver or by depositing a single layer with a thickness of two layers of silver.

If the above-mentioned metamaterial structure is the final deposition, then the substrate along with deposited layers of materials should be annealed above the Curie temperature of BST/BTO/STO, as depicted in block 46. For ferroelectrics like BST, the Curie temperature is the point where the material becomes paraelectric. For BST, the observed Curie temperature is around 750° C. The actual Curie temperature will vary with different ratios of BTO and STO or even for those two individual compounds if they are utilized instead. Annealing should be performed above this temperature. As in this case where the Curie temperature is 750° C., annealing can be performed at a temperature between 750° C. and 960° C. There are publications that show lower Curie temperatures, especially for BTO and STO. The Curie temperature utilized should be associated with the annealing of the material.

Different anneal times for BST are expected in different environmental conditions where annealing is done. Also, a long annealing time may cause diffusion of the material into each other. Annealing of BST is at the most one hour long. For thin layers, annealing may be performed between one minute to around ten minutes.

If the multilayer deposition is not the final deposition and other layers will be added, then the annealing requirements of the additional layers must be understood. Factors can include whether annealing is required for the additional layers, if annealing will be performed during the actual deposition of the following layers instead of post annealing, the melting point of the additional layers, etc. An example of why an additional layer would be added to the structure is to add a protective layer that minimally affects its refractive index.

As has been described, the present invention provides a method for fabricating a metamaterial that can achieve unique refractive indices.

One quality that makes BST desirable, including BTO and STO, is the high dielectric constant as stated earlier, but after deposition and annealing. More commonly studied materials like Titanium Dioxide have a drop in dielectric constant after deposition.

The metamaterials of the present invention have applications where a coating with specific and unique refractive index is required. The two most common attempts when designing metamaterials are to create a material with refractive index near zero or with a refractive index of negative one. These are properties not found in nature. While the individual materials have natural properties, the complete structure will have a new set of unnatural properties as long as the layers of the structure are smaller than the applied wavelength.

While the invention has been particularly shown and described with reference to a preferred embodiment, it will be understood by those skilled in the art that various changes in form and detail may be made therein without departing from the spirit and scope of the invention.

What is claimed is:

1. A method for fabricating a metamaterial, said method comprising:
    determining a fill fraction that provides said metamaterial a zero refractive index for a given electromagnetic wavelength, wherein said fill fraction is a ratio of the total thickness of a first and second silver layers to the thickness of said metamaterial;
    forming a barium strontium titanate (BST) material by mixing barium titanate (BTO) powder with strontium titanate (STO) powder;
    depositing said first layer of silver on a substrate;
    depositing a layer of said BST material on said first layer of silver;
    depositing said second layer of silver on said layer of BST material; and
    annealing said first and second layers of silver, said layer of said BST material, and said substrate at above the Curie temperature of said BST material having said BTO and said STO.

2. The method of claim 1, wherein said BST material includes a composition of BTO and STO ranging from 100/0 mole percent to 0/100 mole percent.

3. The method of claim 1, wherein said substrate includes lenses or other optical devices.

4. The method of claim 1, wherein said substrate is a wafer or plate of fused silica.

5. The method of claim 1, wherein each of said first and second silver layers is deposited at approximately 5 millitorr.

6. The method of claim 1, wherein said BST layer is deposited at approximately 5 millitorr.

7. The method of claim 1, wherein said Curie temperature of said BST material having said BTO and STO is 750° C.

8. The method of claim 1, wherein said annealing is performed at a range between 750° C. and 960° C., inclusive.

9. A method for fabricating a metamaterial, said method comprising:
    determining a fill fraction that provides said metamaterial a zero refractive index for a given electromagnetic wavelength, wherein said fill fraction is a ratio of the total thickness of a first and second gold layers to the thickness of said metamaterial;
    forming a barium strontium titanate (BST) material by mixing barium titanate (BTO) powder with strontium titanate (STO) powder;
    depositing said first layer of gold on a substrate;
    depositing a layer of said BST material on said first layer of gold;
    depositing said second layer of gold on said layer of BST material; and
    annealing said first and second layers of gold, said layer of said BST material, and said substrate at above the Curie temperature of said BST material having said BTO and said STO.

10. The method of claim 9, wherein said BST material includes a composition of BTO and STO ranging from 100/0 mole percent to 0/100 mole percent.

11. The method of claim 9, wherein said substrate includes lenses or other optical devices.

12. The method of claim 9, wherein said substrate is a wafer or plate of fused silica.

13. The method of claim 9, wherein each of said first and second gold layers is deposited at approximately 5 millitorr.

14. The method of claim 9, wherein said BST layer is deposited at approximately 5 millitorr.

15. The method of claim 9, wherein said Curie temperature of said BST material having said BTO and STO is 750° C.

16. The method of claim 9, wherein said annealing is performed at a range between 750° C. and 960° C., inclusive.

17. A hyperbolic metamaterial comprising:
    a first plasmonic material layer made of silver;
    a second plasmonic material layer made of silver;
    a third plasmonic material layer made of silver;
    a first dielectric material layer made of barium strontium titanate (BST) located between said first and second plasmonic layers, wherein said BST includes a mixture of barium titanate (BTO) and strontium titanate (STO); and
    a second dielectric material layer made of BST located between said second and third plasmonic layers, wherein the thicknesses of said first, second and third plasmonic material layers in relation to the thickness of said first and second dielectric material layers are determined to provide said hyperbolic metamaterial a zero refractive index for a given electromagnetic wavelength.

18. The hyperbolic metamaterial of claim 17, wherein said mixture of BTO and STO ranges from 100/0 mole percent to 0/100 mole percent.

19. The hyperbolic metamaterial of claim 17, wherein said first, second and third plasmonic material layers are made of gold.

* * * * *